(12) United States Patent
Sunagawa et al.

(10) Patent No.: US 7,695,855 B2
(45) Date of Patent: Apr. 13, 2010

(54) ELECTRODE FOR LITHIUM SECONDARY BATTERY AND LITHIUM SECONDARY BATTERY

(75) Inventors: Takuya Sunagawa, Naruto (JP); Yasuyuki Kusumoto, Kobe (JP); Shin Fujitani, Kobe (JP); Kensuke Nakatani, Sumoto (JP); Muneto Kobayashi, Suita (JP)

(73) Assignees: Sanyo Electric. Co., Ltd., Osaka (JP); Kishimoto Sangyo Co., Ltd., Osaka (JP)

( * ) Notice: Subject to any disclaimer, the term of this patent is extended or adjusted under 35 U.S.C. 154(b) by 0 days.

(21) Appl. No.: 11/108,831

(22) Filed: Apr. 19, 2005

(65) Prior Publication Data

US 2006/0159997 A1 Jul. 20, 2006

(30) Foreign Application Priority Data

Apr. 20, 2004 (JP) ............................. 2004-124737
Jul. 28, 2004 (JP) ............................. 2004-220566

(51) Int. Cl.
*H01M 10/36* (2006.01)
*H01M 4/02* (2006.01)
*H01M 4/66* (2006.01)

(52) U.S. Cl. .................... 429/128; 429/209; 429/218.1; 429/232

(58) Field of Classification Search ................ 429/209, 429/218.1, 231.95, 232

See application file for complete search history.

(56) References Cited

U.S. PATENT DOCUMENTS

| 6,315,188 | B1 * | 11/2001 | Cadden et al. | ........... 228/122.1 |
| 6,887,511 | B1 * | 5/2005 | Shima et al. | ................... 427/58 |
| 2004/0043294 | A1 * | 3/2004 | Fukui et al. | ................. 429/235 |
| 2006/0159997 | A1 * | 7/2006 | Sunagawa et al. | ........... 429/233 |

FOREIGN PATENT DOCUMENTS

| EP | 1 231 651 A1 | 8/2002 |
| EP | 1 237 210 A1 | 9/2002 |
| JP | 07-335199 A | 2/1995 |
| JP | 2002-216747 A | 8/2002 |
| JP | 2002-260637 A | 9/2002 |
| JP | 2004-71305 A | 3/2004 |
| KR | 2002-0038917 A | 5/2002 |
| WO | WO01/29913 | * 4/2001 |
| WO | 01/31720 A1 | 5/2001 |

\* cited by examiner

*Primary Examiner*—Patrick Ryan
*Assistant Examiner*—A Echelmeyer
(74) *Attorney, Agent, or Firm*—Kubovcik & Kubovcik

(57) ABSTRACT

There is provided an electrode for a lithium secondary battery where particles, composed of an active material capable of occluding and releasing lithium, are arranged on a current collector, the active material particle being directly bonded to the surface of the current collector in a state where the bottom of the active material particle is imbedded in a concave portion formed on the surface of the current collector. A second particle layer may be provided on a first particle layer comprising the active material particles directly bonded to the surface of the current collector.

18 Claims, 18 Drawing Sheets

F I G. 5
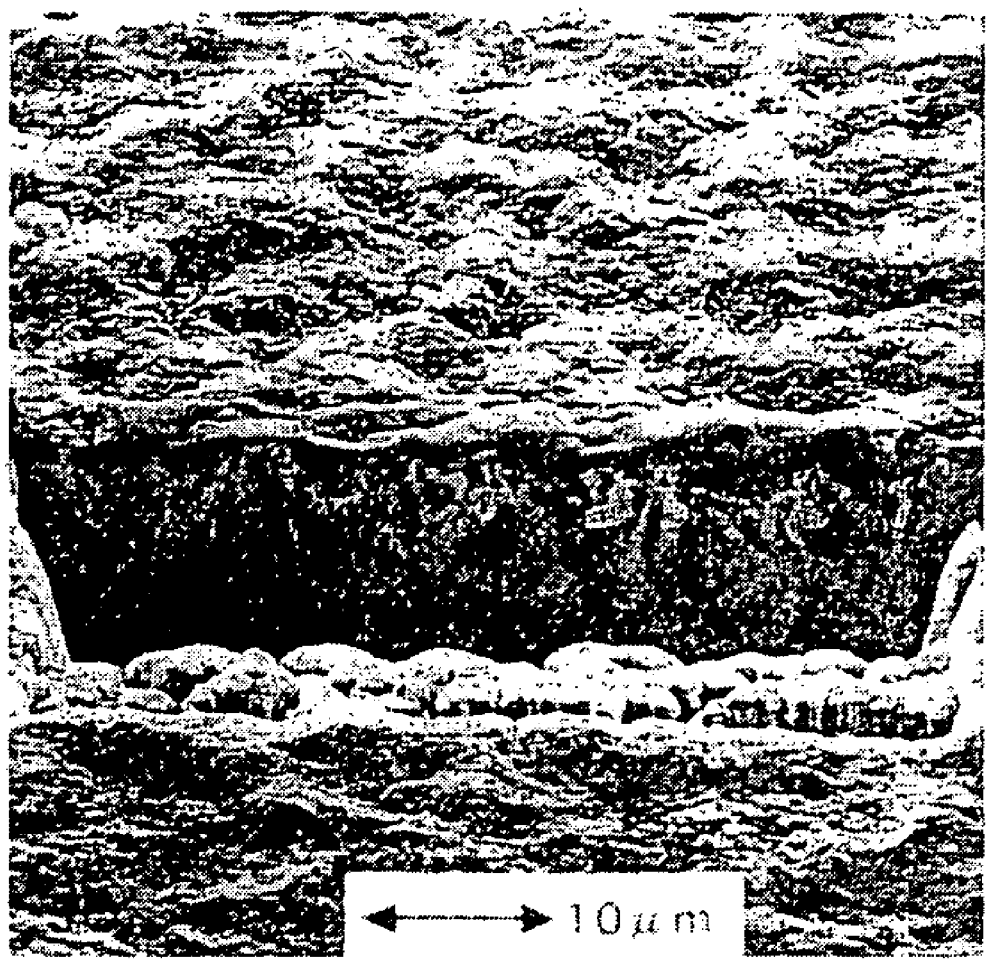

F I G. 7 (a)
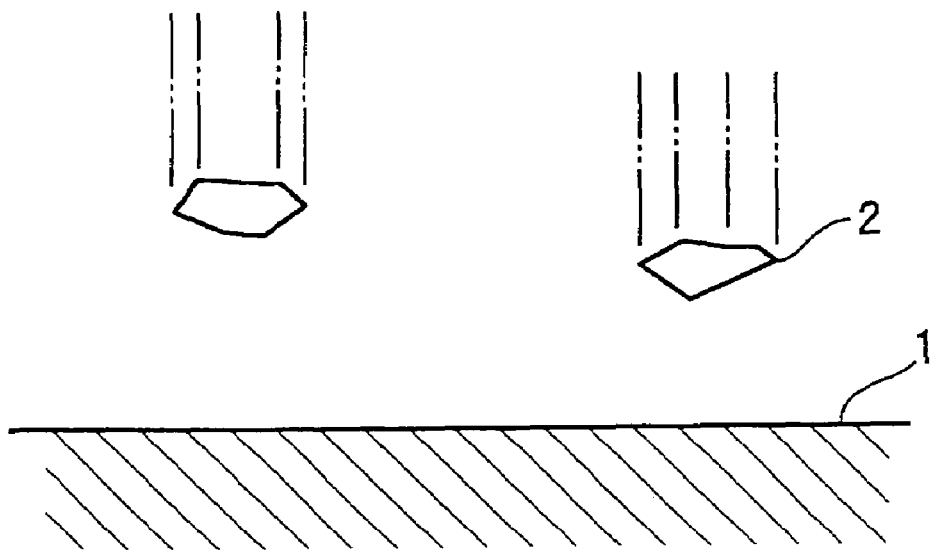
F I G. 7 (b)
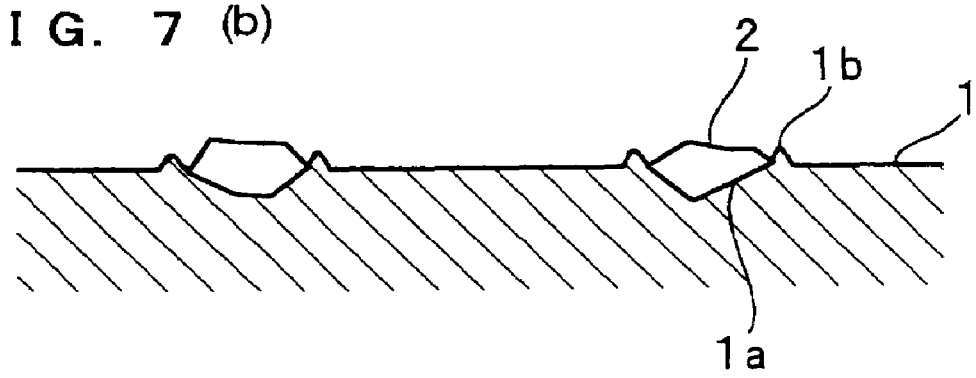

F I G. 1 0
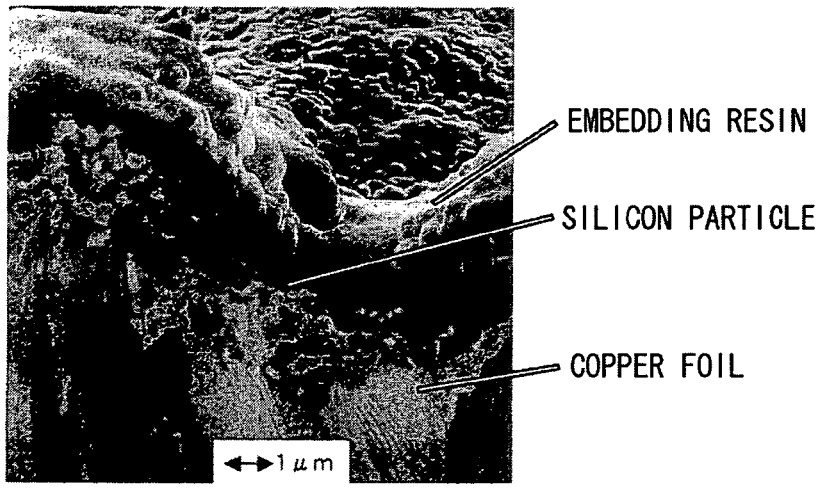

F I G. 1 3
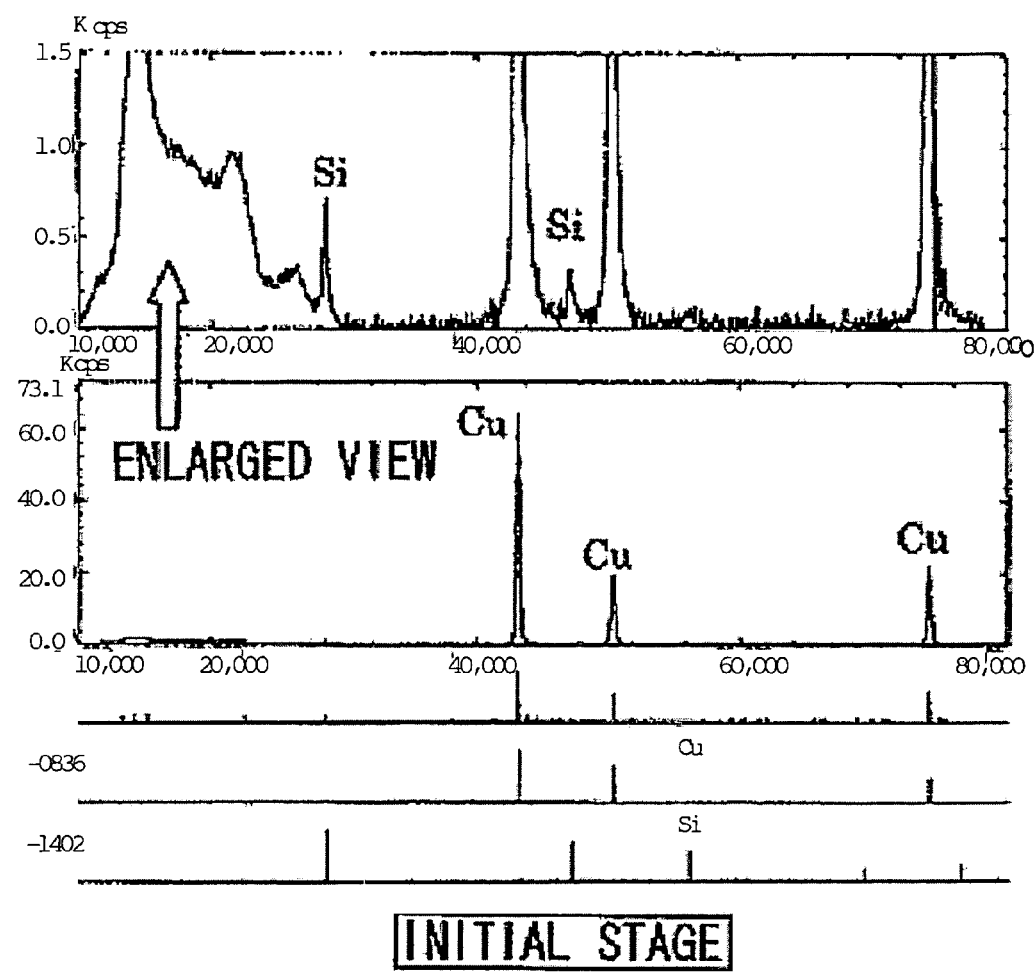

AFTER 40 CYCLES

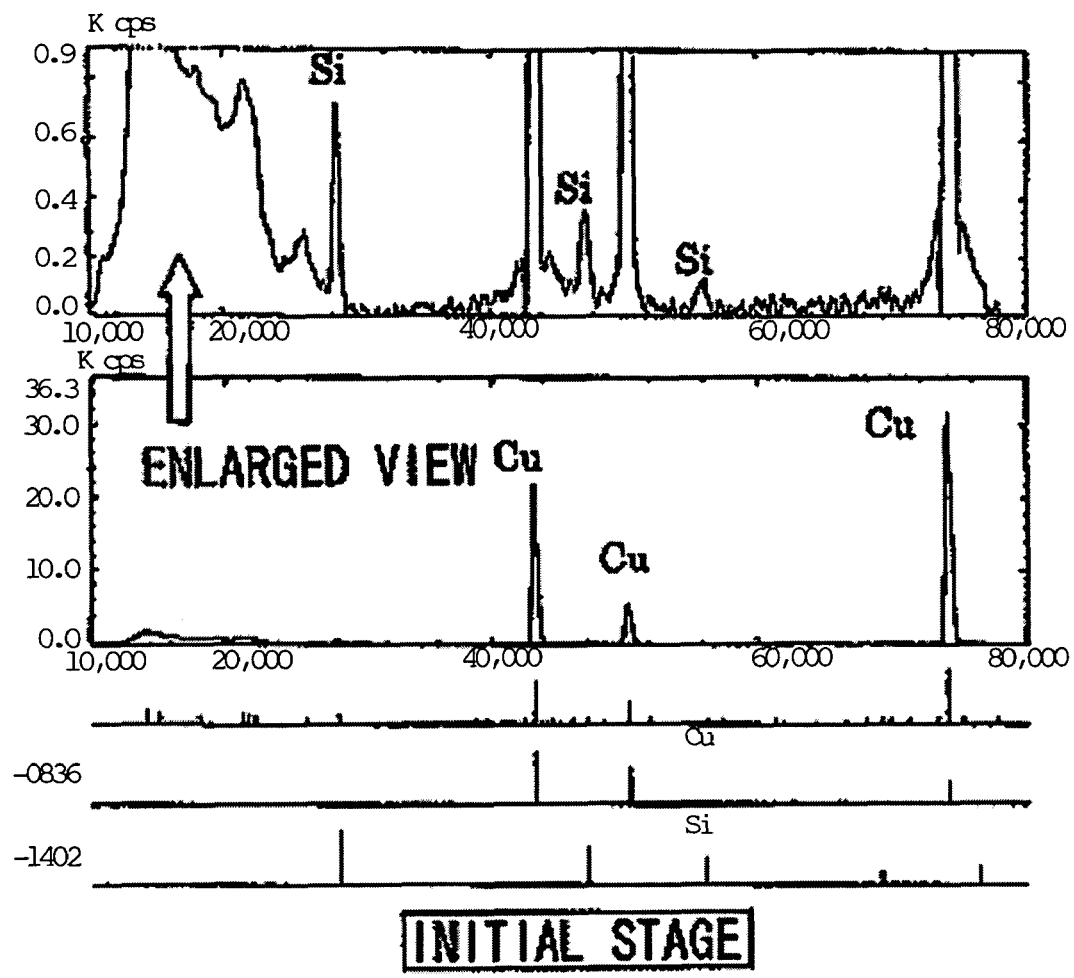
F I G. 1 5

F I G. 1 6
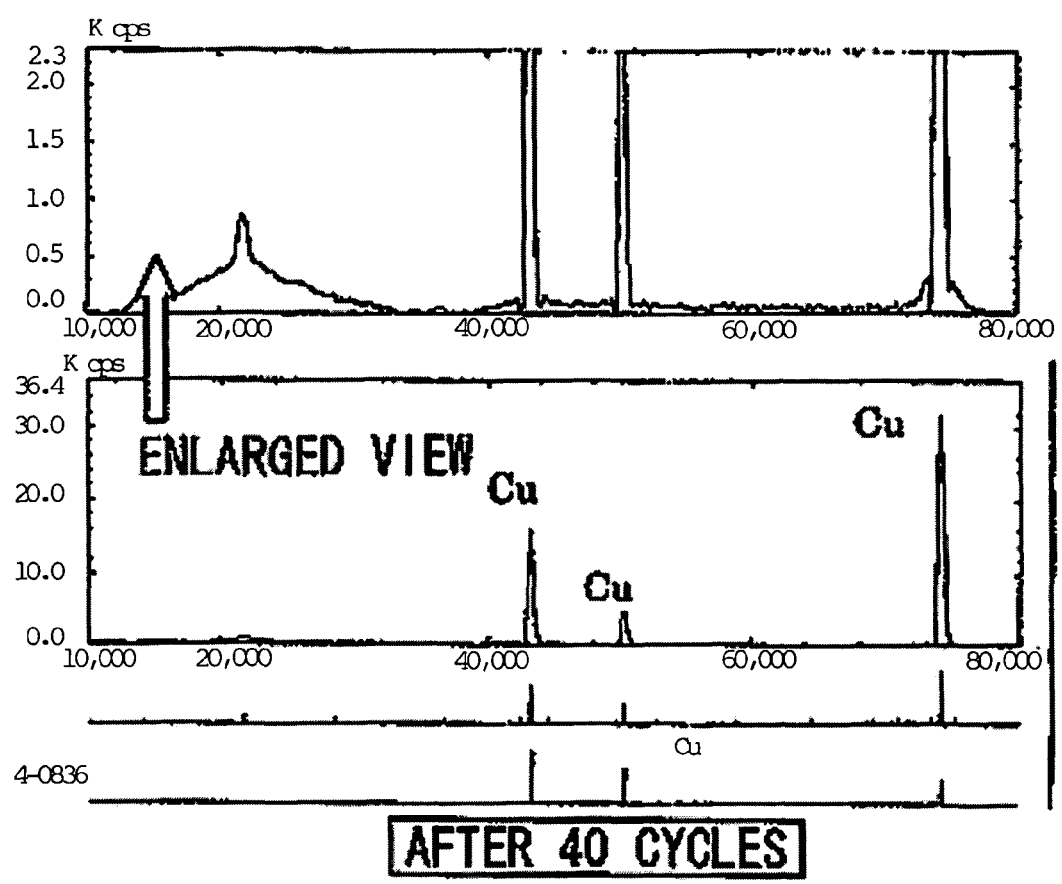

F I G. 2 1
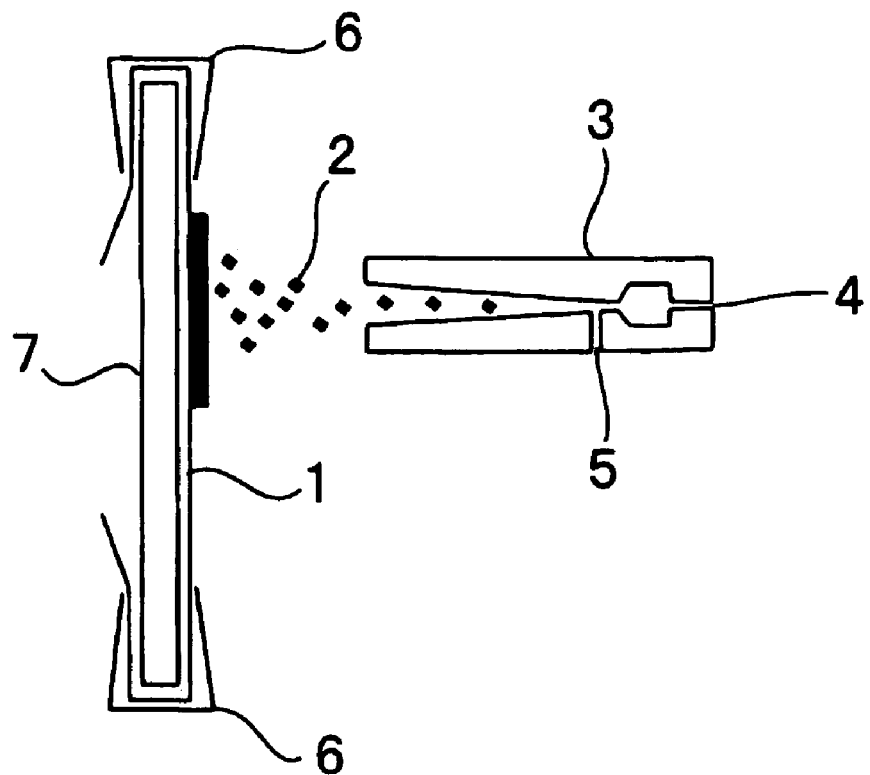
F I G. 2 2
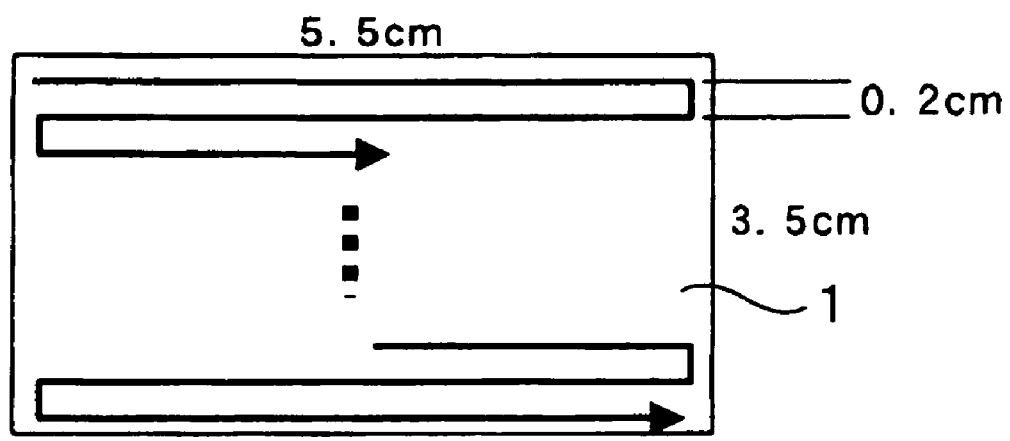

F I G. 2 5
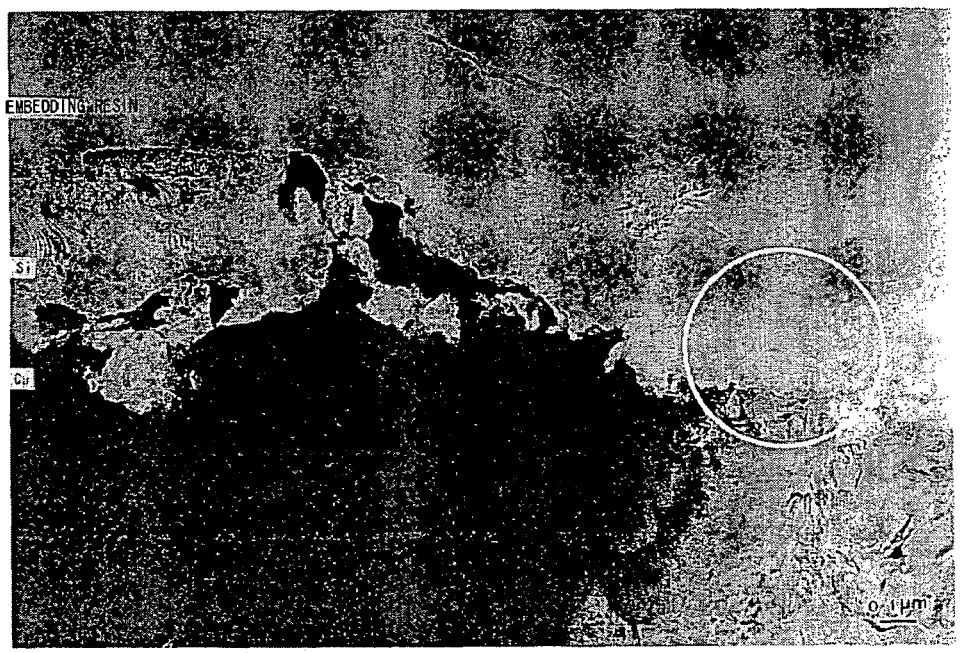

ELECTRODE FOR LITHIUM SECONDARY BATTERY AND LITHIUM SECONDARY BATTERY

BACKGROUND OF THE INVENTION

1. Field of the Invention

The present invention relates to an electrode for a lithium secondary battery, and a lithium secondary battery.

2. Description of the Related Art

In recent years, a lithium secondary battery, which uses a non-aqueous electrolyte and performs charge/discharge by transfer of lithium ions between a positive electrode and a negative electrode, has been utilized as one of new-type secondary batteries with high output and high energy density.

Silicon is a material that is capable of occluding lithium by forming an alloy with lithium. Due to the large theoretical capacity, silicon is attracting attention as a material for an electrode of a lithium secondary battery, with which improvement in energy density can be sought. However, there has been a problem in that an electrode using silicon as an active material is inferior to a carbon material such as graphite in terms of cycle characteristics. One of the causes of this is considered as follows. Since expansion and shrinkage of the active material during charge/discharge are large, the active material is pulverized by stress generated due to the expansion and shrinkage, or is released from a current collector, leading to reduction in current collectability.

The present inventors made the following finding: favorable cycle characteristics are exhibited in such a manner that, in an electrode produced by depositing an amorphous silicon thin film or the like on a current collector such as a copper foil by the CVD method or sputtering method, a slit is formed in the direction of the thin film thickness due to charge/discharge, and the thin film is then separated along the slit into columnar form (International Publication pamphlet No. 01/31720, etc.).

When the electrode is produced by formation of a thin film by the CVD method or sputtering method, it is necessary to keep the inside of a device vacuum, and when the electrodes are to be produced in large quantities, a large-sized vacuum device is required.

SUMMARY OF THE INVENTION

It is an object of the present invention to provide an electrode for a lithium secondary battery, which has a new structure with high volume energy density and excellent charge/discharge cycle characteristics, and a lithium secondary battery using this electrode.

An electrode for a lithium secondary battery according to a first aspect of the present invention is an electrode for a lithium secondary battery characterized in that particles, composed of an active material capable of occluding and releasing lithium, are arranged on a current collector, the active material particle being directly bonded to the current collector surface in a state where the bottom of the active material particle is imbedded in a concave portion formed on the current collector surface.

In the electrode for a lithium secondary battery of the present invention, the active material particle is directly bonded to the current collector surface in a state where the bottom of the active material particle is imbedded in the concave portion formed on the current collector surface. With the bottoms of the active material particles directly bonded to the current collector surface, even when the active material particles occlude lithium thereby to have an expanded volume, the expansion occurs in the longitudinal direction and hence the bonding state between the bottom of the active material particles and the current collector surface can be maintained. This allows favorable current collectability to be maintained even with repetition of the charge/discharge reactions, thereby enabling favorable charge/discharge cycle characteristics.

In the first aspect of the present invention, it is preferable that a mixed phase of a component of the active material particle and a component of the current collector surface be formed on the interface between the active material particles and the current collector surface. Formation of such a mixed phase enables further firm bonding between the active material particles and the current collector surface.

The active material particle for use in the first aspect of the present invention is not particularly limited so long as being composed of an active material capable of occluding and releasing lithium, and the active material may be either a negative electrode active material or a positive electrode active material.

As the negative electrode active material, any material usable as a negative electrode active material of a lithium secondary battery can be used without a particular limitation. As examples thereof, a material that forms an alloy with lithium, a carbon material, and the like can be cited. A volume of the material that is capable of occluding lithium by forming an alloy with lithium expands significantly as the material occludes lithium. Therefore, the adoption of the electrode structure of the present invention allows substantial improvement in charge/discharge cycle characteristics. Examples of the material that forms an alloy with lithium may include silicon, germanium, tin, lead, zinc, magnesium, sodium, aluminum, gallium, indium, and alloys thereof or the like. Silicon is particularly preferably used from the viewpoint of having large charge/discharge capacity. As examples of the active material particle mainly composed of silicon, a silicon elemental particle, a silicon alloy particle and the like can be cited. As the silicon alloy particle, an alloy particle containing 50 atomic % or more of silicon, and the like, are preferably used. As examples of the silicon alloy, a Si—Co alloy, a Si—Fe alloy, a Si—Zn alloy, a Si—Zr alloy, and the like, can be cited.

Examples of the positive electrode active material may include particles of lithium-containing transition metal oxides, such as lithium cobal oxide, lithium nickel oxide and lithium manganese oxide, and particles of transition metal oxides not containing lithium, such as manganese oxide. Moreover, other than those transition metal oxides, any particulate material usable as a positive electrode active material of a lithium secondary battery can be used without a limitation.

In the first aspect of the present invention, it is preferable that the concave portion of the current collector be formed by collision of the active material particle with the current collector surface. It is for example preferable that an air current in which the active material particles are dispersed be sprayed onto the current collector to bring the active material particles into collision with the current collector for formation of concave portions on the current collector surface, and the active material particles be directly bonded to the current collector surface in a state where the bottom of the active material particle is imbedded in the formed concave portion. As an example of such a method for spraying particles along with an air current, so-called cold spraying method can be cited. Cold spraying method is a method comprising dispersing a metal powder, a ceramic powder or the like in a high-speed gas current, and spraying the gas current onto a substrate to bring the particles into collision with the substrate at a high speed so that the particles are allowed to adhere to the substrate surface. Thermal spraying method is a method for melting a material and then spraying the melt material, whereas cold spraying method is a method for spraying a material, which remains solid, onto a substrate. In cold spraying method, for example, a gas, such as nitrogen, helium or air, heated at about 300 to 500° C., is introduced into a Laval nozzle (supersonic nozzle) to be transformed into a supersonic current, which particles are charged into and then accelerated to be brought into collision with the substrate while the particles remain solid. A collision rate of the particles can be set to not lower than 500 m/second.

Further, in the present invention, it is preferable that at least the surface of the current collector be formed of a material having ductility and/or malleability so as to be plastically transformed by impulsive force. By plastic transformation of the current collector surface due to impulsive force, the active material particles can be firmly bonded to the current collector surface. Examples of such a material having ductility and/or malleability may include copper, aluminum, tin, magnesium, iron, cobalt, nickel, zinc, germanium, and indium.

When silicon or silicon alloy particles are used as the active material particles, at least the surface of the current collector is preferably formed of copper or a copper alloy since silicon and copper easily form a solid solution, and further copper has ductility and/or malleability so as to be plastically transformed.

In the case where the current collector surface is formed of the material having ductility and/or malleability, by impulsive force due to collision of the active material particle with the current collector surface, the current collector surface is plastically transformed to receive the active material particle. A concave portion is thereby formed on the current collector surface, and the active material particle is bonded to the current collector surface, inside the concave portion. In the case where the active material particles are not composed of the material having ductility and/or malleability, when the current collector surface is coated with the active material particles, the current collector surface is not plastically transformed and thus the active material particles do not adhere to the surface after collision therewith and drop off. When the active material particles composed of only the material having no ductility and/or malleability are used it is possible to produce an electrode with only one layer of the active material particles allowed to adhere to the current collector surface. By adjustment of sizes of the active material particles, a quantity of the active material particles adhering to the current collector can be therefore controlled.

In the present invention, it is preferable to roughen the current collector surface. With the current collector surface roughened, it is possible to increase the area of the current collector surface so as to increase the quantity of the active material particles to adhere. When a current collector with a roughened surface is used, an arithmetic average roughness (Ra) of the current collector surface is preferably not less than 0.1 µm, and further preferably from 0.1 to 2 µm. The arithmetic average roughness (Ra) is prescribed in the Japanese Industrial Standards (JIS B 0601-1994). It is possible to measure the arithmetic average roughness (Ra) for example by surface roughness detector.

An electrode for a lithium secondary battery according to a second aspect of the present invention is an electrode for a lithium secondary battery characterized in that particles, composed of an active material capable of occluding and releasing lithium, are arranged on a current collector, the electrode comprising: a first particle layer which comprises the active material particles in direct contact with the current collector surface; and a second particle layer composed of the active material particles deposited on the first particle layer, the active material particle in the first particle layer being in direct contact with the current collector surface in a state where the bottom of the active material particle is imbedded in a concave portion formed on the current collector surface.

In the second aspect of the present invention, the active material particle in the first particle layer in direct contact with the current collector surface is directly bonded to the current collector surface in a state where the bottom of the active material particle is imbedded in the concave portion formed on the current collector surface. For this reason, even when the active material particles occlude lithium and the volume of the particles thus expands, it is possible to maintain the bonding between the active material particles and the current collector surface so that favorable charge/discharge cycle characteristics are exhibited.

In the second aspect of the present invention, it is preferable that a mixed phase of a component of the active material particle and a component of the current collector surface be formed on the interface between the active material particles in the first particle layer and the current collector surface. Formation of such a mixed phase enables firm bonding between the active material particles and the current collector surface.

As the active material particles to be used in the second aspect of the present invention, the same ones as the active material particles to be used in the first aspect of the present invention can be used. Further, the active material particles may be a mixture of plural kinds of particles. Specifically, active material particles formed of different kinds of materials can be mixed for use. For example, silicon particles and tin particles can be mixed for use.

Moreover, in the present invention, the active material particles and non-active material particles may be mixed for use. For example, a mixture of silicon particles with copper particles, a mixture of silicon particles with cobalt particles or the like may be used.

In the second aspect of the present invention, the second particle layer may be configured such that at least one kind of particle binds another kind of particles. As an example of the particle for binding another kind of particles, the particle composed of the material having ductility and/or malleability can be cited. Such a particle can be plastically transformed by impulsive force so as to bind between particles not capable of being plastically transformed. Therefore, the second particle layer may be formed by function of the above-mentioned particle as a binder.

Examples of the particle having ductility and/or malleability may include tin, copper, magnesium, iron, cobalt, nickel, zinc, aluminum, germanium, and indium. Among them, tin, magnesium, zinc, aluminum, germanium and indium are each usable as an active material particle of a lithium secondary battery. Further, copper, iron, cobalt and nickel are each usable as a non-active material particle of a lithium secondary battery.

In the present invention, although the average size of the active material particles is not particularly limited, it is preferably not larger than 30 µm, and further preferably in the range of 0.01 to 20 µm. Moreover, the largest size of the active material particle is not larger than 50 µm, and further preferably not larger than 30 µm.

As the current collector in the second aspect of the present invention, the same one as the current collector in the first aspect of the present invention can be used.

Also in the second aspect of the present invention, it is preferable that the concave portion of the current collector surface be formed by collision of the active material particle with the current collector surface. However, in the first aspect and the second aspect of the present invention, the concave portion on the current collector surface is not limited to one formed by collision of the active material particles, but may be one formed by another method.

A lithium secondary battery of the present invention is characterized by the use of the above-mentioned electrode of the present invention. When the electrode of the present invention is a negative electrode, the lithium secondary battery of the present invention is characterized by comprising a positive electrode, a non-aqueous electrolyte, and a negative electrode composed of the above-mentioned electrode.

Although a non-aqueous electrolyte solvent for use in the lithium secondary battery of the present invention is not particularly limited, examples thereof may include cyclic carbonates such as ethylene carbonate, propylene carbonate, butylene carbonate and vinylene carbonate, chain carbonates such as dimethyl carbonate, methyl ethyl carbonate and diethyl carbonate. In the case where the cyclic carbonate is present in the the non-aqueous electrolyte solvent, the cyclic carbonate is preferably used on the active material particle surface since it particularly easily forms a high quality coating film with excellent lithium ion conductivity. In particular, ethylene carbonate and propylene carbonate are preferably used. Moreover, a mixed solvent of the cyclic carbonate and the chain carbonate can be preferably used. Such a mixed solvent particularly preferably contains ethylene carbonate or propylene carbonate and diethyl carbonate.

Further, mixed solvents of the above-mentioned cyclic carbonate and an ether solvent such as 1,2-dimethoxyethane or 1,2-diethoxyethane, or a chain ester such as γ-butyrolactone, sulfolane or methyl acetate, can also be cited as examples.

Moreover, as examples of a non-aqueous electrolyte solute, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like, and mixtures thereof can be cited. In particular, the following solutes are preferably used: $LiXF_y$ (where X is P, As, Sb, B, Bi, Al, Ga or In; y is 6 when X is P, As or Sb, and y is 4 when X is B, Bi, Al, Ga or In) and lithium perfluoroalkylsulfonateimide, $LiN(C_mF_{2m+1}SO_2)(C_nF_{2n+1}SO_2)$ (where m and n are each independently integers of 1 to 4), or lithium perfluoroalkylsulfonatemethide, $LiC(C_pF_{2p+1}SO_2)(C_qF_{2q+1}SO_2)(C_rF_{2r+1}SO_2)$ (where p, q and r are each independently integers of 1 to 4). Among them, $LiPF_6$ is particularly preferably used. Further, as examples of the electrolyte, a gel polymer electrolyte obtained by impregnating a polymer electrolyte such as polyethylene oxide or polyacrylonitrile with an electrolytic solution, and an inorganic solid electrolyte such as LiI and $Li_3N$ can be cited. The electrolyte of the lithium secondary battery can be used without a limitation so long as the lithium compound as the solute for expressing ion conductivity and the solvent where this compound is dissolved and maintained are not decomposed due to voltage during charge, discharge or storage of the battery.

According to the present invention, it is possible to obtain an electrode for a lithium secondary battery, with high volume energy density and excellent charge/discharge cycle characteristics. Further, in the electrode for a lithium secondary battery of the present invention, since the active material particles are directly bonded to the current collector surface, current collectability is high in the electrode, thereby enabling improvement in active material utilization ratio.

BRIEF DESCRIPTION OF THE DRAWINGS

FIG. 5 is a view showing an FIB-SIM image of the cross section of the electrode produced in the example according to the present invention.

FIGS. 7(a) and (b) are schematic sectional views for explaining a state of bonding of active material particles to a current collector surface by a production method according to the present invention.

FIG. 10 is an enlarged view of FIG. 9.

FIG. 13 is a view showing an XRD pattern prior to charge/discharge cycles in Example 1 according to the present invention.

FIG. 15 is a view showing an XRD pattern prior to charge/discharge cycles in Example 2 according to the present invention.

FIG. 16 is a view showing an XRD pattern after the charge/discharge cycles in Example 2 according to the present invention.

FIG. 21 is a schematic view showing a device in cold spraying method used in examples according to the present invention.

FIG. 22 is a plan view showing a scanning path of a spray gun on a current collector in the examples according to the present invention.

FIG. 25 is a view showing a TEM image of the cross section of the electrode prior to the charge/discharge cycles in Example 1 according to the present invention.

DETAILED DESCRIPTION OF THE PREFERRED EMBODIMENTS

Below, the present invention is described in further detail based upon examples. However, the following examples do not limit the present invention, and can be appropriately modified and then implemented within the scope where the spirits of the present invention remain unchanged.

Figure 1:
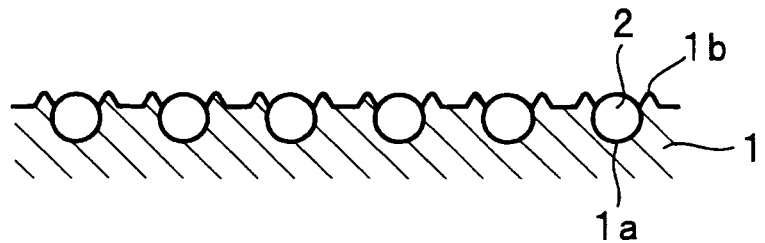
FIG. 1 is a schematic sectional view showing a surface structure of an electrode for a lithium secondary battery of one example according to a first aspect of the present invention.

FIG. 1 is a schematic sectional view showing the surface structure of the electrode for a lithium secondary battery according to the first aspect of the present invention. A concave portion 1a is formed on the surface of a current collector 1. A bottom of an active material particle 2 is in the state of being imbedded in the concave portion 1a. The active material particle 2 is in direct contact with the surface of the current collector 1, inside the concave portion 1a. On the periphery of the concave portion 1a, a convex portion 1b is present which was formed at the time when the concave portion 1a was formed.

Figure 2:
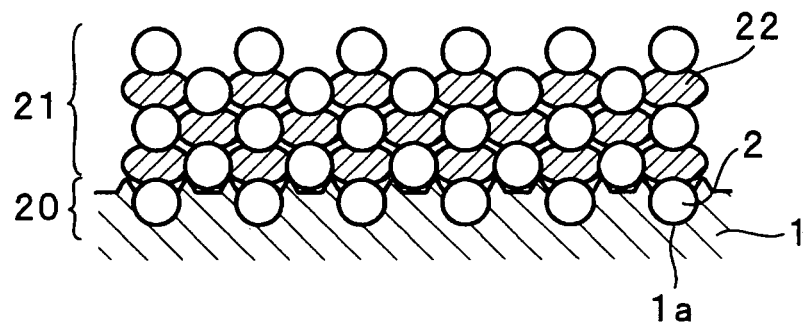
FIG. 2 is a schematic sectional view showing a surface structure of an electrode for a lithium secondary battery of one example according to a second aspect of the present invention.

FIG. 2 is a schematic sectional view showing a surface structure of the electrode for a lithium secondary battery according to the second aspect of the present invention. As shown in FIG. 2, the concave portion 1a is formed on the surface of the current collector 1 in a state where the active material particle 2 in the lowest layer is imbedded in the concave portion 1a. A second particle layer 21 is arranged on a first particle layer 20 comprising the active material particles 2 in a state where the bottom of the active material particle 2 is imbedded in the concave portion 1a on the surface of the current collector 1. In the present example, the second particle layer 21 is formed of the active material particles 2 and another kind of particles 22. Another kind of particle 22 is made of a material having ductility and/or malleability so as to be plastically deformed and binds the active material particles 2, thus serving as a binder for binding the active material particles 2 in the second particle layer 21. In Example 3 described later where a mixture of silicon particles and tin particles is sprayed by cold spraying method onto the current collector surface to be deposited thereon, the tin particle performs the same function as that of another kind of particle 22.

Experiment 1

Example 1

Production of Electrode by Cold Spraying Method, Using Silicon as Active Material Using crystalline silicon particles (average particle size: 2.5 μm) as the active material particles, and an electrolytic copper foil (thickness: 35 μm, arithmetic average roughness Ra: 1.46 μm) as the current collector, the silicon particles were brought into collision with the glossy surface of the electrolytic copper foil which was the opposite side to the roughed surface of the foil by cold spraying method, to produce an electrode. Specifically, a device for cold spraying shown in FIG. 21 was used to produce the electrode. As shown in FIG. 21, the current collector 1 made of the electrolytic copper foil was wrapped around a support plate 7 made of a copper plate with a thickness of 2 mm, each end of which was then fixed with a clip 6. The current collector 1 was wrapped around the support plate 7 with the glossy surface of the electrolytic copper foil turned outside. The support plate 7 was used for preventing the current collector 1 from being broken by the silicon particles 2 when sprayed onto the current collector 1 by a high-speed gas current.

A spray gun 3 was arranged so as to be opposed to the current collector 1. A nitrogen gas with a pressure of 2 MPa, having been heated to about 300° C., was introduced from a gas introduction inlet 4 of the spray gun 3 into the spray gun 3. The temperature of the nitrogen gas released from the spray gun 3 was almost equivalent to room temperature. Further, the silicon particles 2 were introduced from a powder introduction inlet 5 of the spray gun 3. The silicon particles 2 were accelerated by the nitrogen gas having been transformed into a high-speed gas current in the spray gun 4, to be brought into collision with the current collector 1, along with the high-speed gas current. At this time, the nature of the interface between the silicon particles 2 and the current collector 1 was changed by kinetic energy of the particles to lead to binding between the silicon particles 2 and the surface of the current collector 1, and as a result, the silicon particles 2 were firmly bonded to the surface of the current collector 1. Moreover, since the kinetic energy also changes into heat, the temperatures of the current collector 1 and the support plate 7 increased, but those increased temperatures were still far lower than the melting point of silicon.

As shown in FIG. 22, the spray gun 3, having been attached to the front-end of a robot arm, was shifted at a rate of 60 cm/minute, taking a zigzag path on the surface of the current collector 1, to scan a region of 3.5 cm×5.5 cm so that the silicon particles were deposited on this region. It was confirmed that, as shown in FIG. 22, the shift of the spray gun in the lateral direction in a region with a width of 5.5 cm results in deposition of the silicon particles in a region of 5.5 cm×0.2 cm.

Figure 3:
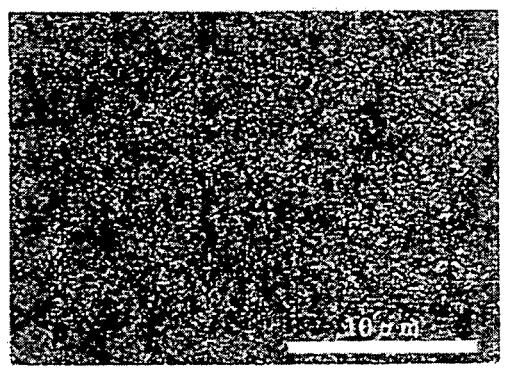
FIG. 3 is a plan view showing an EPMA image of Si on a surface of an electrode produced in an example according to the present invention.
Figure 4:
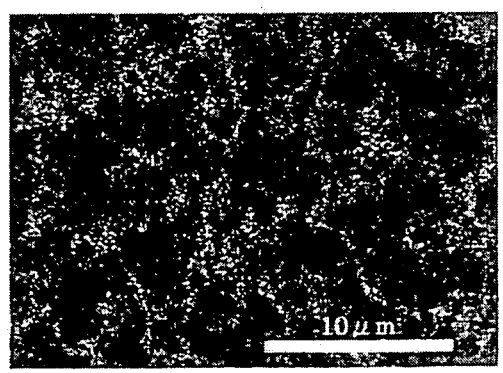
FIG. 4 is a plan view showing an EPMA image of Cu on the surface of the electrode produced in the example according to the present invention.

In the electrode as thus produced, the silicon particles were very firmly bonded to the surface of the copper foil as the current collector. FIGS. 3 and 4 are plan views of the surface of the produced electrode when observed with an electron probe micro-analyzer (EPMA). In FIG. 3, a brightly shining portion is a region where Si is present, while in FIG. 4, a brightly shining portion is a region where Cu is present. It is revealed from FIGS. 3 and 4 that, although almost the entire surface of the current collector is coated with the silicon particles, there exists a portion in which the copper foil is exposed to the surface.

Figure 6:
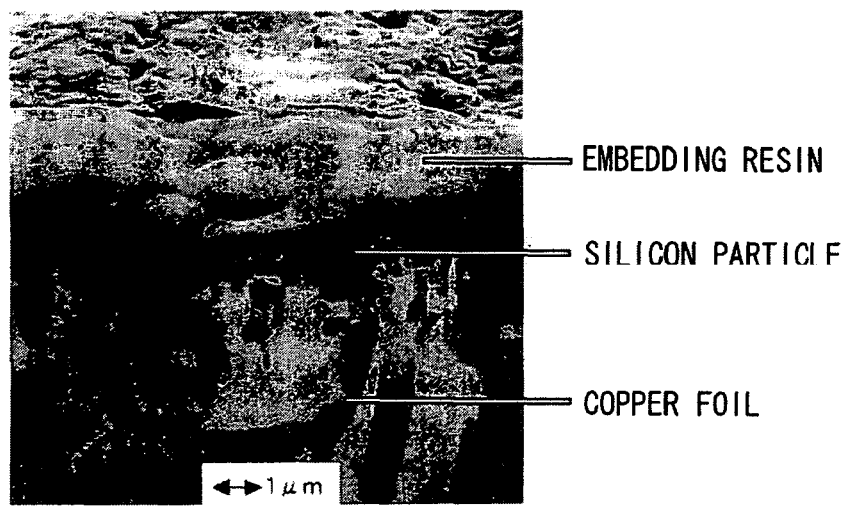
FIG. 6 is an enlarged view of FIG. 5.

FIG. 5 is a SIM image obtained by FIB-SIM observation after coating of the surface of the above-mentioned electrode with an embedding resin. FIG. 6 is an enlarged view of FIG. 5. FIB-SIM observation is a method comprising processing a cross section with a focused ion beam (FIB) so as to be exposed and observing this cross section using a scanning ion microscope (SIM).

It is found that, as apparent from FIGS. 5 and 6, a concave portion is formed on the current collector surface by collision of the silicon particle with the current collector surface, and the silicon particle is bonded to the current collector surface in a state where the bottom of the silicon particle is imbedded in the concave portion. Further, silicon fine particles are present on the periphery of the concave portion, and it is considered that those fine particles were contained in a raw material from the beginning or are pieces of the silicon particles broken due to the collision.

As clear from FIGS. 5 and 6, it is considered that one layer of the silicon particles is deposited on the current collector surface.

FIG. 7 is a sectional view for explaining a mechanism to bond the silicon particle to the current collector surface. As shown in FIG. 7(*a*), the active material particles 2 dispersed in the gas current are sprayed onto the current collector 1, along with the gas current, to be brought into collision with the surface of the current collector 1. As shown in FIG. 7(*b*), the surface of the current collector 1 was plastically transformed, due to the collision of the active material particle 2, to have the concave portion 1*a*. The active material particle 2 is arranged in a state where the bottom thereof is imbedded in the concave portion 1*a*, and the active material particle 2 is bonded to the surface of the current collector 1 in this state. Moreover, on the periphery of the concave portion 1*a*, the convex portion 1*b* is present which was formed at the time when the concave portion 1*a* was formed.

By dissolving the obtained electrode in an acid and then analyzing the dissolved electrode with inductively coupled plasma (ICP), a quantity of silicon deposited on the copper foil was determined to be 0.12 mg per 1 $cm^2$ of the copper foil. Since it took 0.09 minutes for the spray gun to be shifted by 5.5 cm and a thin film of 5.5 cm×0.2 cm was produced by this shift, it is concluded that silicon was deposited by cold spraying method in the region of 5.5 cm×0.2 cm at a rate of 1.44 mg/minute.

The obtained electrode was cut into a size of 2 cm×2 cm, which was equipped with a tab, to complete production of an electrode.

[Preparation of Electrolytic Solution]

In a mixed solvent of ethylene carbonate (EC) and diethyl carbonate (DEC) at a volume rate of 1:1, $LiPF_6$ was dissolved at a ratio of 1.0 mol/litter, to prepare an electrolytic solution.

[Production of Beaker Cell]

Figure 8:
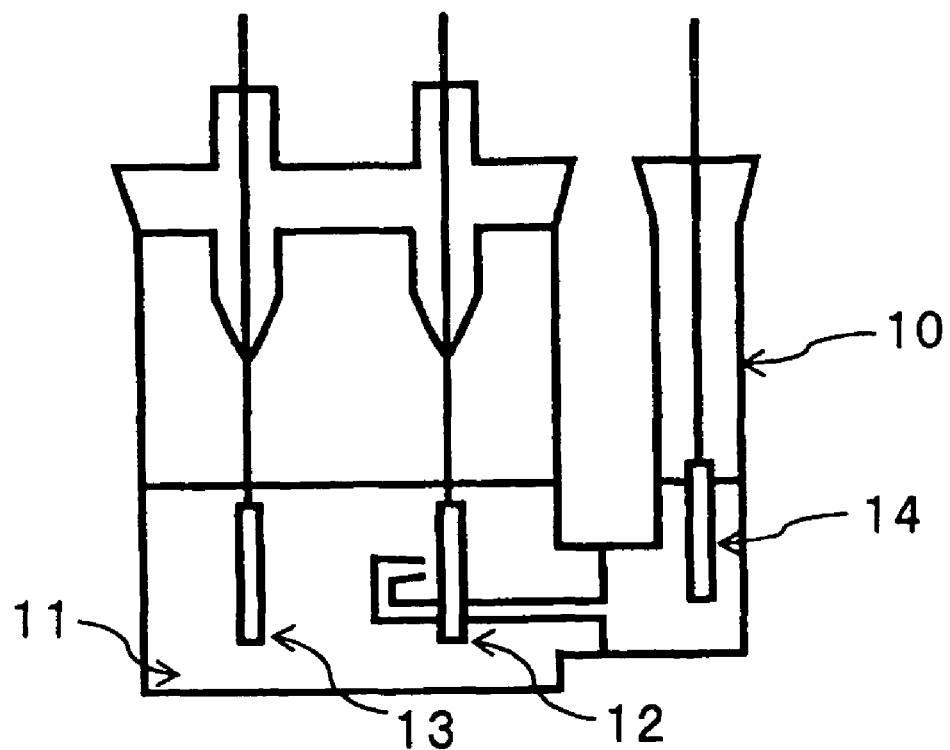
FIG. 8 is a schematic sectional view showing a beaker cell produced in the example according to the present invention.

Using the above-mentioned electrode as a working electrode, molded lithium metal as a counter electrode as well as a reference electrode, and the above-mentioned electrolytic solution as an electrolytic solution, a three-pole type beaker cell shown in FIG. 8 was produced. In the beaker cell shown in FIG. 8, an electrolytic solution 11 has been put in a glass beaker 10, and a working electrode 12, a counter electrode 13 and a reference electrode 14 have been immersed in the electrolytic solution 11.

[Charge/Discharge Cycle Test]

The above-mentioned beaker cell was subjected to a charge/discharge cycle test under the following conditions:

1st to 3rd Cycles

Charge condition: 0.1 mA, with final voltage of 0 V

Discharge condition: 0.1 mA, with final voltage of 2 V (equivalent to discharge of 0.06 It)

4th to 33rd Cycles

Charge condition: 1 mA, with final voltage of 0 V→0.5 mA, with final voltage of 0 V→0.1 mA, with final voltage of 0 V Discharge condition: 1 mA, with final voltage of 2 V (equivalent to discharge of 0.6 It)

34th Cycle

Charge condition: 1 mA, with final voltage of 0 V→0.5 mA, with final voltage of 0 V→0.1 mA, with final voltage of 0 V Discharge condition: 1.6 mA, with final voltage of 2 V (equivalent to discharge of 1 It)

35th Cycle

Charge condition: 1 mA, with final voltage of 0 V→0.5 mA, with final voltage of 0 V→0.1 mA, with final voltage of 0 V Discharge condition: 3.2 mA, with final voltage of 2 V (equivalent to discharge of 2 It).

36th Cycle

Charge condition: 1 mA, with final voltage of 0 V→0.5 mA, with final voltage of 0 V→0.1 mA, with final voltage of 0 V Discharge condition: 4.8 mA, with final voltage of 2 V (equivalent to discharge of 3 It).

37th Cycle

Charge condition: 1 mA, with final voltage of 0 V→0.5 mA, with final voltage of 0 V→0.1 mA, with final voltage of 0 V Discharge condition: 0.16 mA, with final voltage of 2 V (equivalent to discharge of 0.1 It)

38th to 40th Cycles

Charge condition: 1 mA, with final voltage of 0 V→0.5 mA, with final voltage of 0 V→0.1 mA, with final voltage of 0 V Discharge condition: 1 mA, with final voltage of 2 V (equivalent to discharge of 0.6 It)

The measurement results are shown in Table 1, along with measurement results of Example 2 below.

It is to be noted that a capacity maintenance ratio was obtained by comparing a discharge capacity at each cycle with a discharge capacity at the first cycle. Further, a discharge capacity at the 34th cycle was used as a discharge capacity of 1 It. A discharge capacity at the 35th cycle was used as a discharge capacity of 2 It. A discharge capacity at the 36th cycle was used as a discharge capacity of 3 It. A discharge capacity at the 37th cycle was used as the discharge capacity of 0.1 It.

Figure 11:
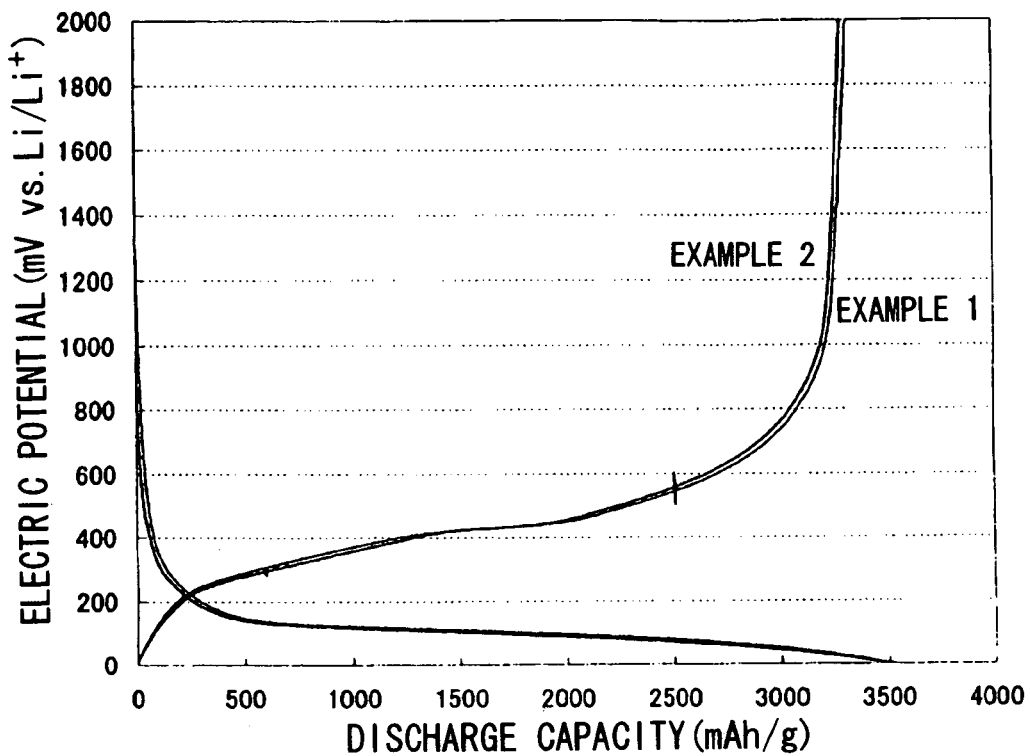
FIG. 11 is a view showing charge/discharge curves at the first cycle of the beaker cells produced in Example 1 and Example 2 according to the present invention.
Figure 12:
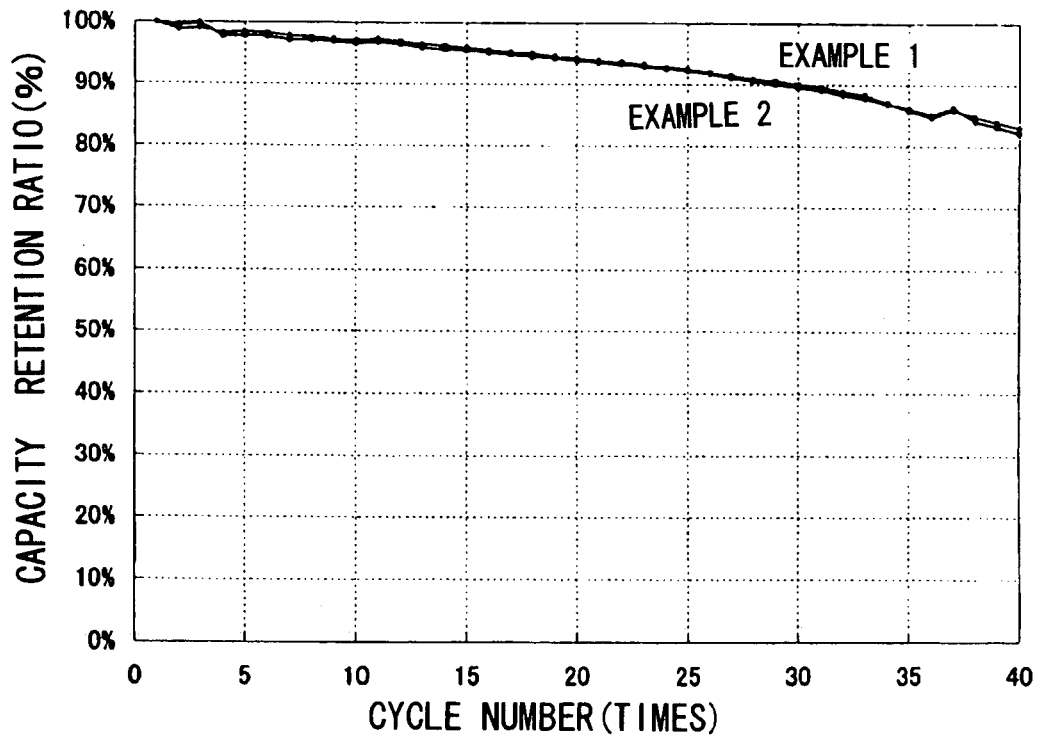
FIG. 12 is a view showing changes in discharge capacity with cycles of the beaker cells produced in Example 1 and Example 2 according to the present invention.

Moreover, discharge curves at the first cycle are shown in FIG. 11, and changes in discharge capacity with cycles are shown in FIG. 12.

Example 2

Production of Electrode by Cold Spraying Method, Using Silicon as Active Material Silicon particles were allowed to adhere to the current collector surface by cold spraying method to produce an electrode in the same manner as in Example 1 except that the electrolytic copper foil was wrapped around the support plate with the roughened surface of the electrolytic copper foil on the front side in order to allow the silicon particles to adhere to the roughened surface side of the copper foil.

Figure 9:
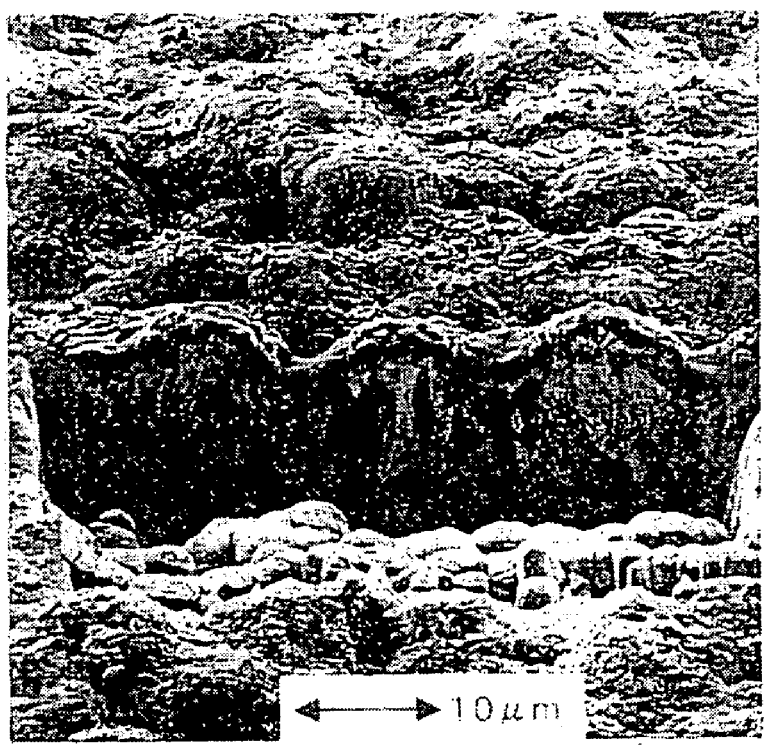
FIG. 9 is a sectional view showing an FIB-SIM image of a cross section of an electrode produced in an example according to the present invention.

Also in the electrode obtained in the present example, the silicon particles were very firmly bonded to the current collector. FIGS. 9 and 10 are sectional views obtained by FIB-SIM observation of the cross section of the resultant electrode. It is found that, as apparent from FIGS. 9 and 10, the silicon particles adhere along the concavity and convexity of the current collector surface. In comparison between the concave portion and the convex portion on the current collector surface, it appears that a comparatively larger quantity of silicon particles have adhered to the concave portion than to the convex portion.

Since the thickness of the adhering silicon particles is about 1 μm, it appears that one layer of the silicon particles has been deposited on the current collector surface.

By dissolving the electrode in an acid and then analyzing the dissolved electrode with the ICP, the quantity of the silicon particles deposited on the current collector surface was measured to be 0.17 mg per 1 cm$^2$ of the copper foil. It was thus revealed that, although the electrode was produced under the same conditions as in Example 1, a greater quantity of silicon was deposited than in the case of Example 1. This is presumably because the quantity of the silicon particles to adhere to the surface increased with increase in area of the current collector surface due to formation of large concave and convex portions on the surface.

Since it took 0.09 minutes for the spray gun to be shifted by 5.5 cm and the silicon particles were deposited in a region of 5.5 cm×0.2 cm by this shift, it is concluded that the silicon particles were deposited by cold spraying method in the region of 5.5 cm×0.2 cm at a rate of 2.04 mg/minute.

The obtained electrode was cut into a size of 2 cm×2 cm, which was equipped with a tab, to complete production of an electrode.

[Preparation of Electrolytic Solution]

An electrolytic solution was prepared in the same manner as in Example 1.

[Production of Beaker Cell]

A beaker cell was produced in the same manner as in Example 1.

[Charge/Discharge Cycle Test]

The above-mentioned beaker cell was subjected to a charge/discharge cycle test under the following conditions:

1st to 3rd Cycles

Charge condition: 0.1 mA, with final voltage of 0 V

Discharge condition: 0.1 mA, with final voltage of 2 V (equivalent to discharge of 0.05 It)

4th to 33rd Cycles

Charge condition: 1 mA, with final voltage of 0 V→0.5 mA, with final voltage of 0 V→0.1 mA, with final voltage of 0 V Discharge condition: 1 mA, with final voltage of 2 V (equivalent to discharge of 0.5 It)

34th Cycle

Charge condition: 1 mA, with final voltage of 0 V→0.5 mA, with final voltage of 0 V→0.1 mA, with final voltage of 0 V Discharge condition: 2.2 mA, with final voltage of 2 V (equivalent to discharge of 1 It)

35th Cycle

Charge condition: 1 mA, with final voltage of 0 V→0.5 mA, with final voltage of 0 V→0.1 mA, with final voltage of 0 V Discharge condition: 4.4 mA, with final voltage of 2 V (equivalent to discharge of 2 It).

36th Cycle

Charge condition: 1 mA, with final voltage of 0 V→0.5 mA, with final voltage of 0 V→0.1 mA, with final voltage of 0 V Discharge condition: 6.6 mA, with final voltage of 2 V (equivalent to discharge of 3 It).

37th Cycle

Charge condition: 1 mA, with final voltage of 0 V→0.5 mA, with final voltage of 0 V→0.1 mA, with final voltage of 0 V Discharge condition: 0.22 mA, with final voltage of 2 V (equivalent to discharge of 0.1 It)

38th to 40th Cycles

Charge condition: 1 mA, with final voltage of 0 V→0.5 mA, with final voltage of 0 V→0.1 mA, with final voltage of 0 V Discharge condition: 1 mA, with final voltage of 2 V (equivalent to discharge of 0.05 It)

The measurement results are shown in Table 1, along with the measurement results of Example 1.

TABLE 1

|  | Charge Capacity at 1st Cycle (mAh/g) | Discharge Capacity at 1st Cycle (mAh/g) | Charge/Discharge Efficiency at 1st Cycle (%) | Capacity Retention Ratio at 33rd Cycle (%) | Discharge Capacity of 1 lt/Discharge Capacity of 0.1 lt (%) | Discharge Capacity of 2 lt/Discharge Capacity of 0.1 lt (%) | Discharge Capacity of 3 lt/Discharge Capacity of 0.1 lt (%) |
| --- | --- | --- | --- | --- | --- | --- | --- |
| Example1 | 3529 | 3317 | 94 | 88 | 101 | 100 | 99 |
| Example2 | 3511 | 3288 | 94 | 88 | 101 | 100 | 99 |

It is found that, as apparent from the results shown in Table 1 and FIG. 11, each of the electrodes obtained in Examples 1 and 2 can function as a negative electrode of a lithium secondary battery. It is also found that, as apparent from the results shown in Table 1 and FIG. 12, the electrodes of Examples 1 and 2 have favorable charge/discharge cycle characteristics as well as favorable load characteristics.

Comparative Example 1

Production of Silicon Thin Film Electrode by Sputtering Method

On a surface of a rolled foil as a current collector, made of a heat-resisting copper alloy (zirconium copper alloy) with a roughened surface, an amorphous silicon thin film with a size of 20 cm×50 cm was deposited by sputtering method, to produce a silicon thin film electrode. Conditions for forming the thin film are shown in Table 2. Specifically, After vacuum pumping of a chamber to 1×10$^{-4}$ Pa, argon (Ar) was introduced into the chamber to stabilize gas pressure. With the gas pressure in a stable state, direct current pulse voltage was applied to a silicon sputtering source to deposit the amorphous silicon thin film on the current collector surface.

The quantity of silicon deposited was 1165 mg. It is thus considered that 1.28 mg of silicon was deposited in the area of 5.5 cm×0.2 cm, which is the same area as those in Examples 1 and 2. In the present comparative example, the time required for the film formation was 146 minutes, and the same length of time was required for producing the thin film of 5.5 cm×0.2 cm because the film formation area is unrelated to the film formation time in sputtering method. Accordingly, the silicon thin film of 5.5 cm×0.2 cm is concluded to have been produced at a rate of 0.0088 mg/minute by sputtering method.

The obtained thin film was cut into a size of 2 cm×2 cm along with the current collector, which was equipped with a tab, to complete production of an electrode.

TABLE 2

| | |
|---|---|
| DC Pulse Frequecy | 100 kHz |
| DC Pulse Width | 1856 ns |
| DC Pulse Electric Power | 2000 W |
| Argon Flow Rate | 60 sccm |
| Gas Pressure | 2~2.5 × $10^{-1}$ Pa |
| Deposition Time | 146 min |
| Film Thickness | 5 μm |

[Preparation of Electrolytic Solution]

An electrolytic solution was prepared in the same manner as in Example 1.

[Production of Beaker Cell]

A beaker cell was produced in the same manner as in Example 1.

[Charge/Discharge Cycle Test]

The above-mentioned beaker cell was subjected to a charge/discharge cycle test under the following conditions:

1st to 5th Cycles

Charge condition: 1 mA, with final voltage of 0 V

Discharge condition: 1 mA, with final voltage of 2 V (equivalent to discharge of 0.26 It)

Comparative Example 2

Production of Silicon Thin Film Electrode by Vapor Deposition Method

On a surface of a rolled copper foil (thickness: 26 μm) with a roughened surface as a current collector, an amorphous silicon thin film with a size of 10 cm×60 cm was deposited by electron beam vapor deposition method. As a vapor deposition material, small granular silicon (99.999%) was used. Conditions for vapor deposition are shown in Table 3.

The quantity of silicon deposited was 792 mg. It is thus considered that 1.45 mg of silicon was deposited in the area of 5.5 cm×0.2 cm, which is the same area as those in Examples 1 and 2. In the present comparative example, the time required for the film formation was 30 minutes, and the same length of time was required for producing the thin film of 5.5 cm×0.2 cm because the film formation area is unrelated to the film formation time in vapor deposition method. Accordingly, the silicon film of 5.5 cm×0.2 cm is concluded to have been produced at a rate of 0.048 mg/minute by vapor deposition method.

The obtained thin film was cut into a size of 2 cm×2 cm along with the current collector, which was equipped with a tab, to complete production of an electrode.

TABLE 3

| | |
|---|---|
| Electron Beam Acceleration Voltage | 5 kV |
| Electron Beam Current | 100 mA |
| Vapor Deposition Atmosphere | <$10^{-4}$ Pa |
| Deposition Time | 30 min |
| Film Thickness | 6 μm |

[Preparation of Electrolytic Solution]

An electrolytic solution was prepared in the same manner as in Example 1.

[Production of Beaker Cell]

A beaker cell was produced in the same manner as in Example 1.

[Charge/Discharge Cycle Test]

The above-mentioned beaker cell was subjected to a charge/discharge cycle test under the following conditions:

1st to 5th Cycles

Charge condition: 1 mA, with final voltage of 0 V

Discharge condition: 1 mA, with final voltage of 2 V (equivalent to discharge of 0.26 It)

Comparative Example 3

Production of Silicon Thin Film Electrode by Thermal Spraying Method

On a surface of an electrolytic copper foil (thickness: 35 μm) with a roughened surface as a current collector, a silicon thin film was deposited by plasma thermal spraying method. Since detailed conditions for thermal spraying are not known, a rate for producing the silicon thin film could not be calculated like the case of Examples 1 and 2 and Comparative Examples 1 and 2.

The obtained thin film along with the current collector was cut into a size of 2 cm×2 cm, which was equipped with a tab, to complete production of an electrode.

[Preparation of Electrolytic Solution]

An electrolytic solution was prepared in the same manner as in Example 1.

[Production of Beaker Cell]

A beaker cell was produced in the same manner as in Example 1.

[Charge/Discharge Cycle Test]

The above-mentioned beaker cell was subjected to a charge/discharge cycle test under the following conditions:

1st to 5th Cycles

Charge condition: 0.1 mA, with final voltage of 0 V

Discharge condition: 0.1 mA, with final voltage of 2 V

The rate for forming a thin film with a size of 5.5 cm×0.2 cm, the discharge capacity at the first cycle, the discharge capacity at the fifth cycle, and the capacity maintenance ratio at the fifth cycle, measured in each of Examples 1 and 2 and Comparative Examples 1 to 3, are shown in

TABLE 4

|  | Production Method | Rate for Producing Thin Film with Size of 5.5 × 0.2 cm (mg/min) | Discharge Capacity at 1st Cycle (mAh/g) | Discharge Capacity at 5th Cycle (mAh/g) | Capacity Retention Ratio at 5th Cycle (%) |
|---|---|---|---|---|---|
| Example1 | Cold Spraying | 1.44 | 3317 | 3245 | 98 |
| Example2 | Cold Spraying | 2.04 | 3288 | 3238 | 98 |
| Comparative Example1 | Sputtering | 0.0088 | 3333 | 3283 | 98 |
| Comparative Example2 | Vapor Deposition | 0.048 | 516 | 150 | 29 |
| Comparative Example3 | Thermal Spraying | — | 142 | 112 | 79 |

It is found that, as apparent from the results shown in Table 4, the electrodes can be produced at faster rates by cold spraying method than by sputtering method or vapor deposition method. It is also found that the electrode produced by cold spraying method has excellent charge/discharge cycle characteristics as compared with the electrode produced by vapor deposition method or thermal spraying method.

[Evaluation of State of Electrode After Charge/Discharge Cycles]

The electrodes of Examples 1 and 2 were evaluated by XRD (X-ray diffraction), SIM observation of the electrode surface, and FIB-SIM observation of the electrode cross section.

Figure 14:
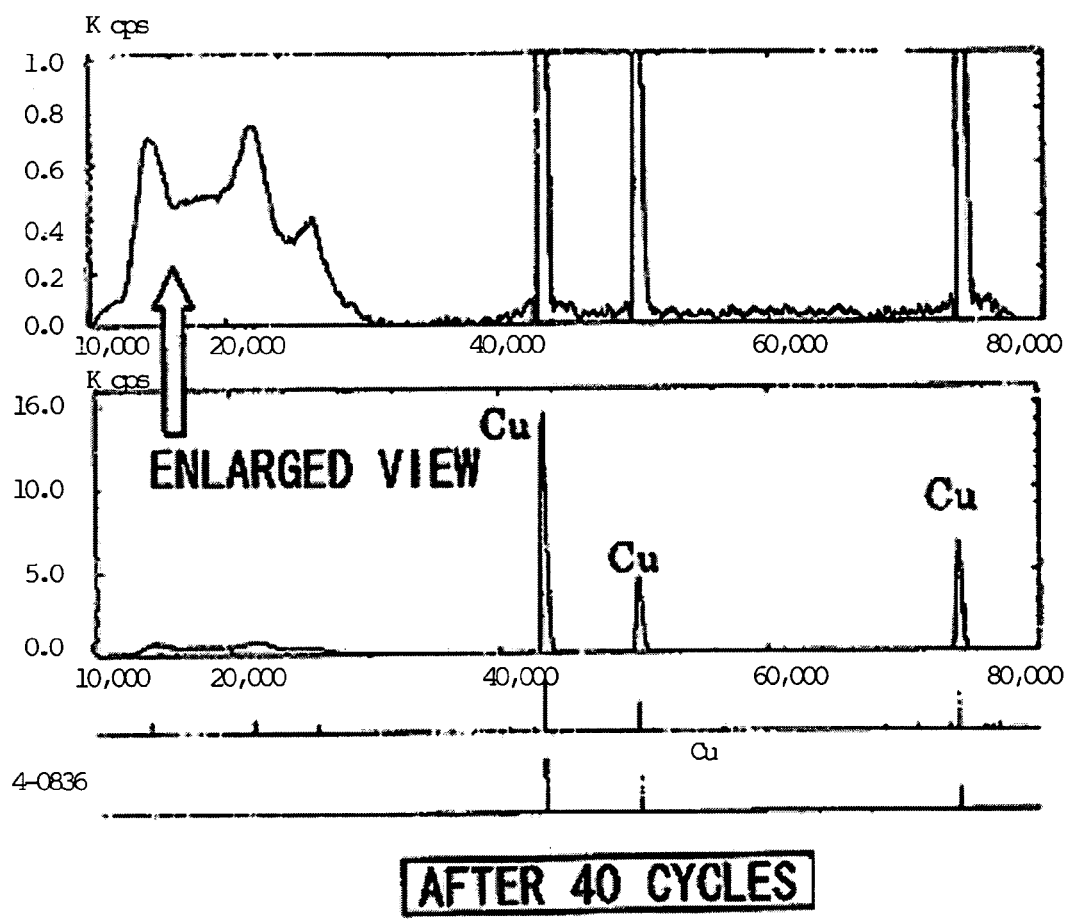
FIG. 14 is a view showing an XRD pattern after the charge/discharge cycles in Example 1 according to the present invention.

FIG. 13 is a view showing an XRD pattern of the electrode prior to the charge/discharge cycles in Example 1. FIG. 14 is a view showing an XRD pattern of the electrode after the charge/discharge cycles (40 cycles) in Example 1. FIG. 15 is a view showing an XRD pattern of the electrode prior to the charge/discharge cycles in Example 2. FIG. 16 is a view showing an XRD pattern of the electrode after the charge/discharge cycles (40 cycles) in Example 2.

As apparent from the comparison between FIGS. 13 and 14 and the comparison between FIGS. 15 and 16, in the electrodes of Example 1 and 2, the presence of crystalline silicon was confirmed prior to the charge/discharge cycles, but not confirmed after the charge/discharge cycles. It is therefore considered that silicon was crystalline prior to the charge/discharge cycles, but is substantially amorphous after the charge/discharge cycles.

Figure 17:
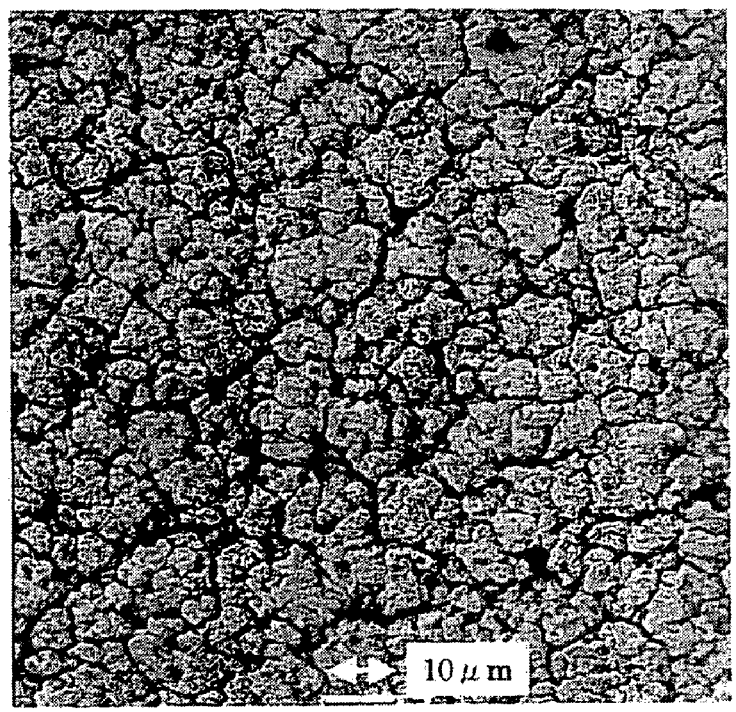
FIG. 17 is a view showing a SIM image of the surface of the electrode after the charge/discharge cycles in Example 1 according to the present invention.
Figure 18:
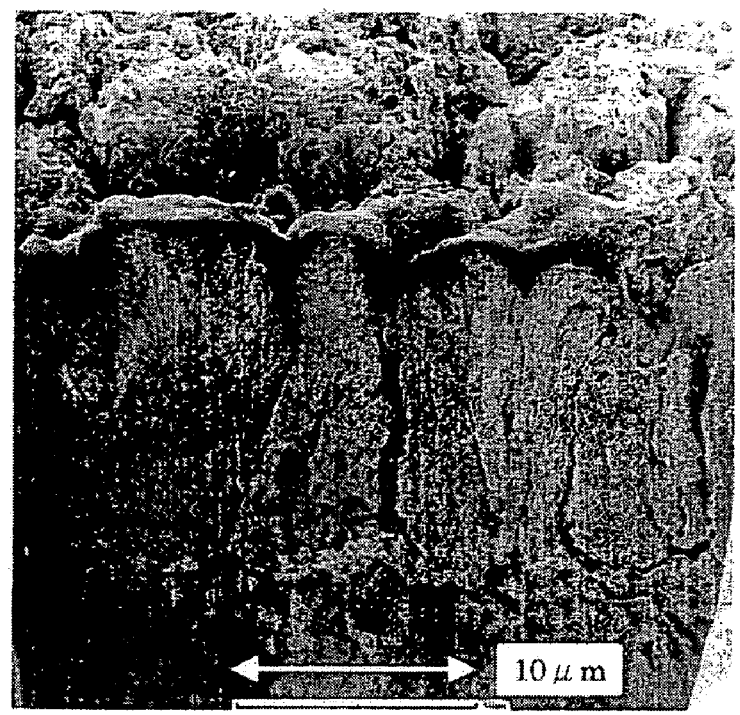
FIG. 18 is a view showing an FIB-SIM image of the cross section of the electrode after the charge/discharge cycles in Example 1 according to the present invention.
Figure 19:
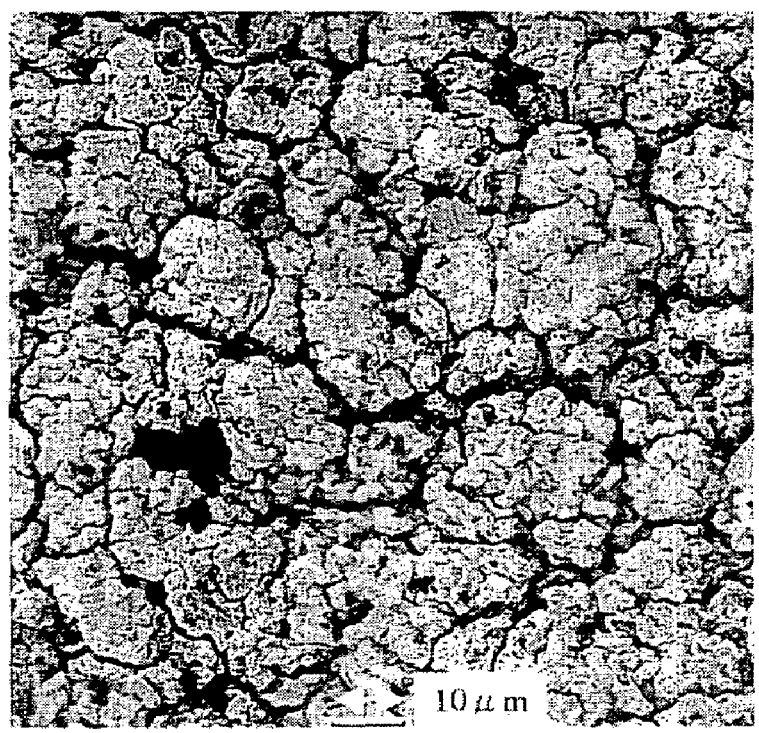
FIG. 19 is a view showing a SIM image of the surface of the electrode after the charge/discharge cycles in Example 2 according to the present invention.
Figure 20:
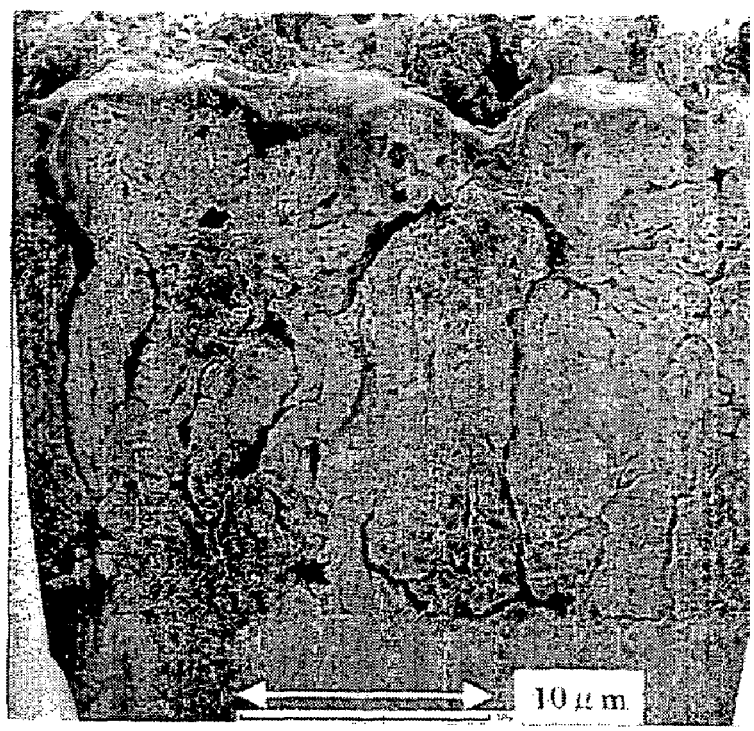
FIG. 20 is a view showing an FIB-SIM image of the cross section of the electrode after the charge/discharge cycles in Example 2 according to the present invention.

FIG. 17 shows a SIM image of the surface of the electrode in Example 1. FIG. 18 shows an FIB-SIM image of the cross section of the electrode in Example 1. FIG. 19 shows a SIM image of the surface of the electrode in Example 2. FIG. 20 shows an FIB-SIM image of the cross section of the electrode in Example 2. Each of FIGS. 17 to 20 shows the state of the electrode after the charge/discharge cycles.

It is found that, as clear from FIGS. 17 to 20, the particles on the current collector surface expand in the longitudinal direction to have a columnar structure after the charge/discharge cycles. Moreover, the inside of the columnar structure is porous, which is considered to result in large expansion of the silicon particles in the longitudinal direction. It is further thought that favorable charge/discharge cycle characteristics were obtained because the bottom of the particle is bonded to the current collector surface and this bonding state is maintained.

Example 3

Production of Electrode by Cold Spraying Method, Using Mixture of Silicon Particles and Tin Particles In Examples 1 and 2 where only the silicon particles were used as the active material particles as above described, one layer of the silicon particles, namely a layer of the silicon particles with the thickness of only one silicon particle, is considered to be deposited on the copper foil. This is presumably because the silicon particles are difficult to bind by cold spraying method, and after substantial coating of the copper foil surface with the silicon particles, the silicon particle being brought into collision with the copper foil surface does not adhere to the top of the silicon particle and drops off. Therefore, adjustment of the sizes of the active material particles by utilizing deposition of the particles with only one-particle thickness enables control of the quantity of the active material particles to adhere to the current collector surface.

Further, as an example of another method for adjusting the quantity of the active material particles to adhere, a method can be cited in which particles composed of a material having ductility and/or malleability are used as a binder, to deposit plural layers of the particles. In the present example, tin particles were used as the particles composed of the material having ductility and/or malleability, and particles of mixture of the silicon particles and the tin particles were allowed to adhere to the copper foil surface by cold spraying method, to produce an electrode.

The silicon particles (average particle size: 18 μm) are mixed with the tin particles (average particle size: 8 μm) such that a mass ratio of the silicon particles to the tin particles was 8:2. The mixture was allowed to adhere to the surface of the copper foil as the current collector by cold spraying method in the same manner as in Example 1, to produce an electrode. From a difference in weight between the obtained electrode and the copper foil with the same area as that of the obtained electrode, the weight of the deposited mixture of silicon and tin was found to be 9.24 mg per 1 $cm^2$ of the copper foil. With this deposited quantity far larger than the deposited quantities in Examples 1 and 2, it was found that, when particles to be used do not have ductility and/or malleability, particles having ductility and/or malleability can be mixed therewith to serve as a binder so that plural layers of particles can be deposited.

Experiment 2

[TEM Observation of Electrode Produced in Example 1]

The cross section of the electrode produced in Example 1 was observed using a transmission electron microscope (TEM) equipped with an energy dispersion X-ray spectroscopy (EDS). The electrode was cut along the direction of the cross section to produce a flaky sample, and the sample was observed with the TEM.

Figure 23:
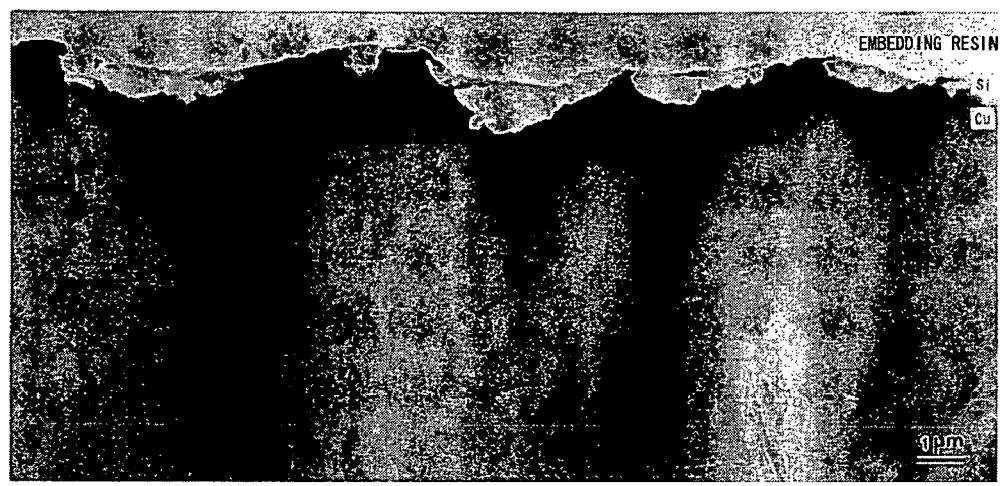
FIG. 23 is a view showing a TEM image of the cross section of the electrode prior to the charge/discharge cycles in Example 1 according to the present invention.
Figure 24:
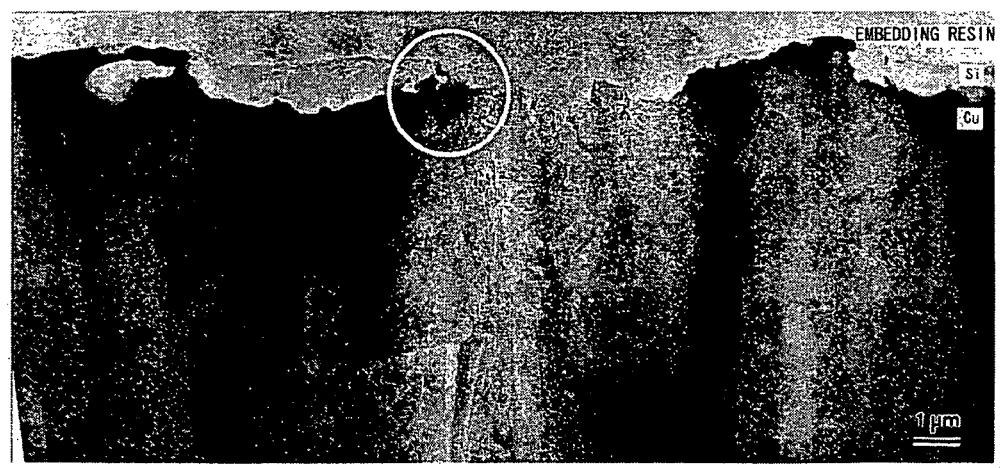
FIG. 24 is a view showing a TEM image of the cross section of the electrode prior to the charge/discharge cycles in Example 1 according to the present invention.

FIGS. 23 and 24 are TEM images each showing the vicinity of the interface between the silicon particles and the copper foil in this electrode sample. In FIGS. 23 and 24, "Si" indicates silicon particles, "Cu" indicates a copper foil, and "Bonding resin" indicates an embedding resin. The scaling factors for FIGS. 23 and 24 are both 12,000. In the locations for observation shown in FIGS. 23 and 24, a portion, which had been processed to be as thin as possible and in which the vicinity of the boundary between the Si layer (silicon particles) and the Cu layer (copper foil) was clear, was subjected to elementary analysis with the EDS. The portion having been processed to be as thin as possible was selected for observation because spatial resolution is higher in elementary analysis of a thinner portion.

FIG. 25 is an enlarged view of a portion enclosed with a white circle shown in FIG. 24. The portion enclosed with the white circle shown in FIG. 25 was selected as a location for observation. The scaling factor for FIG. 25 is 100,000.

Figure 26:
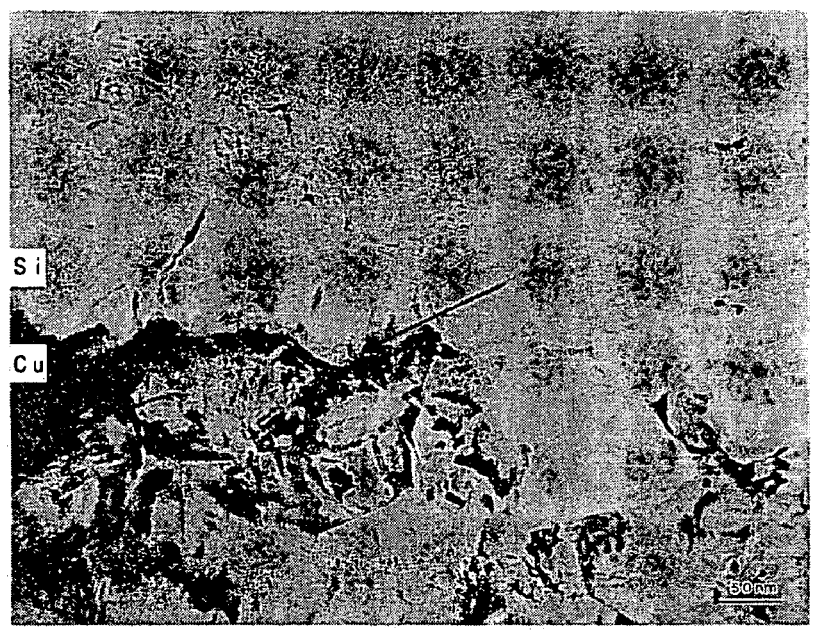
FIG. 26 is a view showing a TEM image of the cross section of the electrode prior to the charge/discharge cycles in Example 1 according to the present invention.
Figure 27:
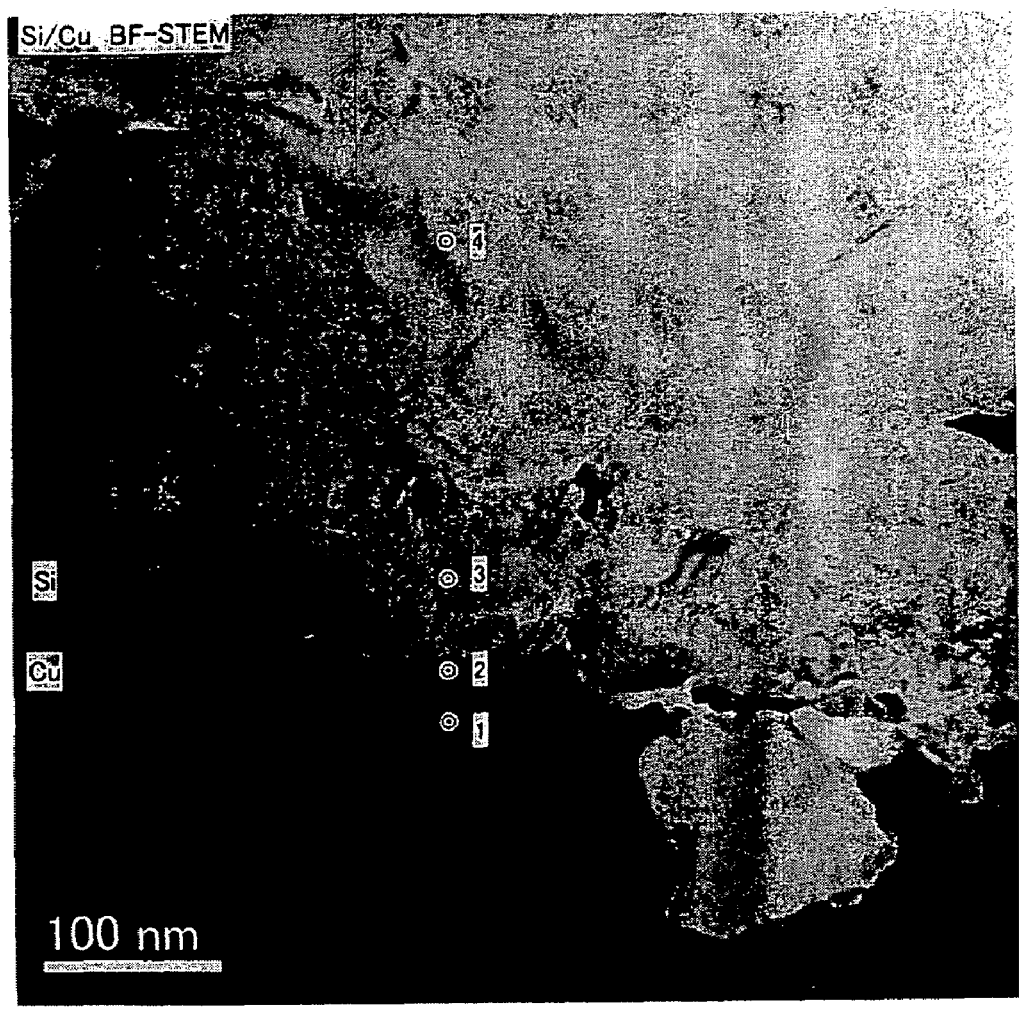
FIG. 27 is a view showing a TEM image of the cross section of the electrode prior to the charge/discharge cycles in Example 1 according to the present invention.

FIGS. 26 and 27 are TEM images each showing a location for observation. At the top of an indicator shown in FIG. 26, the interface between the Cu layer and the Si layer is clearly observed. The scaling factor for FIG. 26 is 400,000, and the scaling factor for FIG. 27 is 305,000.

Analysis points No. 1 to No. 4 shown in FIG. 27, the Cu layer (copper foil) region (region at a distance of about 2 μm from the interface between the silicon particles and the copper foil), and a SiC substrate (not containing Cu) fixing the sample were separately subjected to elementary analysis by EDS. The measurement region at each of the analysis points has a diameter of about 1 to 2 nm. The measurement results are shown in Table 5.

As obvious from the above, it is found that in the vicinity of the interface between the silicon particles and the copper foil, a mixed phase where the copper components as the current collector components are mixed among the silicon particles has been formed.

Although the method such as cold spraying method was used to bring the active material particles into collision with the current collector surface so as to adhere thereto in the above examples, the present invention is not limited to this, so long as the active material particle is directly bonded to the current collector surface in a state where the bottom of the active material particle is imbedded in the concave portion formed on the current collector surface.

What is claimed is:

1. An electrode for a lithium secondary battery where active material particles, composed of an active material capable of occluding and releasing lithium, are arranged on a current collector, the active material particles being directly bonded to the current collector surface in a state where the bottom of the active material particle is imbedded in a concave portion formed on the current collector surface,

TABLE 5

| | Place for Analysis | Si Atomic % | Si Strength | Cu Atomic % | Cu Strength | Others |
|---|---|---|---|---|---|---|
| No. 4 | At Distance of 300 nm from Interface on Si Side | 98 | 8800 | 1.9 | 300 | — |
| No. 3 | At Distance of 50 nm from Interface on Si Side | 98 | 11600 | 2.1 | 460 | — |
| No. 2 | Interface | 64 | 7760 | 36 | 8000 | Oxygen Detected |
| No. 1 | At Distance of 20 nm from Interface on Cu Side | 7.0 | 1110 | 93 | 26800 | — |
| Cu Layer Region | At Distance of 2 μm from Interface on Cu Side | 5.4 | 710 | 95 | 22800 | — |
| SiC | | 99.7 | 24000 | 0.7 | 150 | Carbon Detected |

In the vicinity of the interface of the analysis point No. 2, Si/Cu=64/36 (atomic %). At the analysis point No. 3 at a distance of 50 nm from this interface on the Si side, and at the analysis point No. 4 at a distance of 300 nm from the interface on the Si side, about 2 atomic % of Cu was detected. On the SiC substrate not containing Cu, 0.7 atomic % of Cu (strength: 150) was detected. This may be considered to indicate a signal of Cu from the copper foil due to contamination of Cu or scattered electrons. Since the strengths of Cu at the analysis points No. 3 and No. 4 are higher than that on the SiC substrate, it is considered that Cu measured at those analysis points were detected not because of the contamination or scattered electrons, but because of diffusion of Cu from the copper foil as the current collector into the Si layer (silicon particles).

At the analysis point No. 1 located at a distance of 20 nm from the interface on the Cu side, 7.0 atomic % of Si was detected. Meanwhile, in the Cu layer area (inside the copper foil) at a distance of 2 μm from the interface on the Cu side, 5.4 atomic % of Si was detected, which was a similar level of Si to that detected at the analysis point No. 1. Since Si is not contained in the Cu layer region, Si detected at the analysis point No. 1 is considered to indicate a signal of Si from the SiC substrate.

wherein a mixed phase of a component of the active material particles and a component of the current collector surface is formed on the interface between the active material particles and the current collector surface, the concave portion is formed by collision of the active material particle with the current collector surface and the shape of the concave portion corresponds to the bottom surface of the active material particle that forms the concave portion.

2. The electrode for a lithium secondary battery according to claim 1, wherein the active material is a material that is capable of occluding lithium by forming an alloy with lithium.

3. The electrode for a lithium secondary battery according to claim 1, wherein the active material is silicon.

4. The electrode for a lithium secondary battery according to claim 1, wherein at least the surface of the current collector is formed of copper or a copper alloy.

5. A lithium secondary battery comprising the electrode according to claim 1.

6. A lithium secondary battery, comprising a positive electrode, a non-aqueous electrolyte, and a negative electrode composed of the electrode according to claim 1.

7. An electrode for a lithium secondary battery where active material particles, composed of an active material capable of occluding and releasing lithium, are arranged on a current collector,
the electrode comprising: a first particle layer which comprises the active material particles directly bonded to the current collector surface; and a second particle layer which comprises the active material particles deposited on the first particle layer,
the active material particles in the first particle layer being directly bonded to the current collector surface in a state where the bottom of the active material particle is imbedded in a concave portion toned on the current collector surface,
wherein a mixed phase of a component of the active material particles and a component of the current collector surface is formed on the interface between the active material particles in the first particle layer, the current collector surface and the concave portion is formed by collision of the active material particle with the current collector surface and the shape of the concave portion corresponds to the bottom surface of the active material particle that forms the concave portion.

8. The electrode for a lithium secondary battery according to claim 7, wherein the active material particles are a mixture of plural kinds of particles.

9. The electrode for a lithium secondary battery according to claim 8, wherein at least one kind of particle binds another kind of particles in the second particle layer.

10. The electrode for a lithium secondary battery according to claim 9, wherein the particles in the second particle layer include tin, copper, magnesium, iron, cobalt, nickel, zinc, aluminum, germanium or indium.

11. The electrode for a lithium secondary battery according to claim 9, wherein the binding particles are composed of a material having ductility and/or malleability.

12. A lithium secondary battery comprising the electrode according to claim 11.

13. The electrode for a lithium secondary battery according to claim 7, wherein a particle which is a non-active material is mixed in the active material particles.

14. The electrode for a lithium secondary battery according to claim 7, wherein the active material is a material that is capable of occluding lithium by forming an alloy with lithium.

15. The electrode for a lithium secondary battery according to claim 7, wherein particles mainly composed of silicon are contained as the active material particles.

16. The electrode for a lithium secondary battery according to claim 7, wherein at least the surface of the current collector is formed of copper or a copper alloy.

17. A lithium secondary battery comprising the electrode according to claim 7.

18. A lithium secondary battery, comprising a positive electrode, a non-aqueous electrolyte, and a negative electrode composed of the electrode according to claim 7.

* * * * *